(12) United States Patent
Eydeland et al.

(10) Patent No.: US 7,337,122 B2
(45) Date of Patent: Feb. 26, 2008

(54) METHOD FOR PRODUCING A SUPERIOR INSURANCE MODEL FOR COMMODITY EVENT RISK

(75) Inventors: Alexander Eydeland, Atlanta, GA (US); Daniel J. Mahoney, Atlanta, GA (US); David B. MacKenzie, Roswell, GA (US)

(73) Assignee: Mirant Americas, Inc., Atlanta, GA (US)

(*) Notice: Subject to any disclaimer, the term of this patent is extended or adjusted under 35 U.S.C. 154(b) by 959 days.

(21) Appl. No.: 10/342,028

(22) Filed: Jan. 14, 2003

(65) Prior Publication Data

US 2004/0138927 A1    Jul. 15, 2004

(51) Int. Cl.
*G06Q 40/00* (2006.01)

(52) U.S. Cl. .......................... 705/4; 705/37
(58) Field of Classification Search .............. 705/4, 705/36 R, 37
See application file for complete search history.

(56) References Cited

U.S. PATENT DOCUMENTS

| | | | | |
|---|---|---|---|---|
| 4,839,804 A | * | 6/1989 | Roberts et al. | 705/36 R |
| 5,202,827 A | * | 4/1993 | Sober | 705/36 R |
| 5,884,286 A | * | 3/1999 | Daughtery, III | 705/36 R |
| 5,970,479 A | * | 10/1999 | Shepherd | 705/37 |
| 5,974,403 A | * | 10/1999 | Takriti et al. | 705/412 |
| 6,105,000 A | * | 8/2000 | Hickman et al. | 705/10 |
| 6,470,321 B1 | * | 10/2002 | Cumming et al. | 705/4 |
| 6,862,580 B1 | * | 3/2005 | Ford | 705/37 |
| 7,024,384 B2 | * | 4/2006 | Daughtery, III | 705/36 R |
| 7,027,992 B2 | * | 4/2006 | Zaccaria et al. | 705/4 |
| 7,089,191 B2 | * | 8/2006 | Baron et al. | 705/4 |
| 7,162,444 B1 | * | 1/2007 | Machado et al. | 705/35 |
| 2002/0062231 A1 | * | 5/2002 | Zaccaria et al. | 705/4 |
| 2002/0194113 A1 | * | 12/2002 | Lof et al. | 705/37 |

FOREIGN PATENT DOCUMENTS

JP    02002259709 A    *    9/2002

OTHER PUBLICATIONS

Gersten, Hedging your megawatts; electric utilities, Nov. 1, 1999, Journal of Accountancy, No. 5, vol. 188; p. 47.*
Geman, From Bachelier and Lundberg to insurance and weather derivatives, 2000, Conference Moshe Plato 1999, vol. 1, 81-95.*
Power Markets Week, Utilities create self-insurance program to lessen impact of outages, Mar. 29, 1999, Section: Marketplace, p. 9.*

(Continued)

*Primary Examiner*—Jeffrey A. Smith
*Assistant Examiner*—Tran N Nguyen
(74) *Attorney, Agent, or Firm*—Smith Frohwein Tempel Greenlee Blaha, LLC; Gregory Scott Smith (57) ABSTRACT

A method for producing an insurance model includes the steps of calculating insurance payouts, calculating daily call payouts, calculating statistics of insurance payout obligations, selecting an insurance premium, and selecting a hedge amount. One aspect of the present invention is to determine a combination of insurance premium to charge and a hedge amount to place using daily calls, or other such financial instruments, such that some measure of return of the total portfolio of the insurance policy meets some maximum or minimum criteria.

4 Claims, 7 Drawing Sheets

OTHER PUBLICATIONS

Scott, Weather Hedging; unreliable in energy wholesale business, Energy User News, May 1, 2001, No. 5, vol. 26; p. 17.*

Johnson, Risk management: The bridge to the right price, Oct. 2001, Electric Perspectives, vol. 26, No. 5; p. 52-64.*

Generation Week, Forced outage Insurance offered, Oct. 17, 2007, vol. 3, No. 42; p. 7.*

Business Wire, Swiss Re New Markets and Mirant Offer Generator Forced Outage Insurance Product, Oct. 10, 2001.*

S. Roberts, Convergence brings new opportunities for risk managers, Business Insurance, p. 18.*

Risk Management, When the lights go out in Georgia, or anywhere else; Coverage; Mirant Corp., Swiss Re New Markets Corps. Agreements; Brief Article, Dec. 1, 2001, No. 12, vol. 48; p. 7.*

Global Power Report, Market uncertainty could see increase in demand for plant outage insurance, Jun. 20, 2002, Section: Finance, p. 10.*

* cited by examiner

| Date | Block | Path | Price |
|------|-------|------|-------|
| 7/1/2002 | 1 | 0 | 27.26 |
| 7/1/2002 | 1 | 1 | 27.31 |
| 7/1/2002 | 1 | 2 | 49.96 |
| 7/1/2002 | 1 | 3 | 31.90 |
| 7/1/2002 | 1 | 4 | 33.08 |
| 7/1/2002 | 1 | 5 | 27.79 |
| 7/1/2002 | 1 | 6 | 33.08 |
| 7/1/2002 | 1 | 7 | 27.31 |
| 7/1/2002 | 1 | 8 | 27.26 |
| 7/1/2002 | 1 | 9 | 27.79 |
| 7/1/2002 | 1 | 10 | 30.52 |
| 7/1/2002 | 1 | 11 | 27.26 |
| 7/1/2002 | 1 | 12 | 27.79 |
| 7/1/2002 | 1 | 13 | 30.52 |
| 7/1/2002 | 1 | 14 | 27.31 |
| 7/1/2002 | 1 | 15 | 33.08 |
| 7/1/2002 | 1 | 16 | 27.79 |
| 7/1/2002 | 1 | 17 | 30.52 |
| 7/1/2002 | 1 | 18 | 27.79 |
| 7/1/2002 | 1 | 19 | 27.79 |
| 7/1/2002 | 1 | 20 | 27.79 |
| 7/1/2002 | 1 | 21 | 27.79 |
| 7/1/2002 | 1 | 22 | 35.15 |
| 7/1/2002 | 1 | 23 | 27.79 |
| 7/1/2002 | 1 | 24 | 27.31 |
| 7/1/2002 | 1 | 25 | 27.37 |
| 7/1/2002 | 1 | 26 | 44.35 |
| 7/1/2002 | 1 | 27 | 30.52 |
| 7/1/2002 | 1 | 28 | 27.79 |
| 7/1/2002 | 1 | 29 | 31.90 |
| 7/1/2002 | 1 | 30 | 27.26 |
| 7/1/2002 | 2 | 0 | 23.10 |
| 7/1/2002 | 2 | 1 | 24.58 |
| 7/1/2002 | 2 | 2 | 28.38 |
| 7/1/2002 | 2 | 3 | 30.60 |
| 7/1/2002 | 2 | 4 | 34.86 |
| 9/30/2002 | 3 | 0 | 31.74 |
| 9/30/2002 | 3 | 1 | 15.03 |
| 9/30/2002 | 3 | 2 | 22.35 |
| 9/30/2002 | 3 | 3 | 22.56 |
| 9/30/2002 | 3 | 4 | 17.84 |
| 9/30/2002 | 3 | 5 | 19.53 |
| 9/30/2002 | 3 | 6 | 30.61 |
| 9/30/2002 | 3 | 7 | 31.62 |
| 9/30/2002 | 3 | 8 | 34.84 |
| 9/30/2002 | 3 | 9 | 22.57 |
| 9/30/2002 | 3 | 10 | 19.44 |
| 9/30/2002 | 3 | 11 | 17.84 |
| 9/30/2002 | 3 | 12 | 26.28 |
| 9/30/2002 | 3 | 13 | 35.61 |
| 9/30/2002 | 3 | 14 | 34.98 |
| 9/30/2002 | 3 | 15 | 289.15 |
| 9/30/2002 | 3 | 16 | 28.70 |
| 9/30/2002 | 3 | 17 | 58.53 |
| 9/30/2002 | 3 | 18 | 35.63 |
| 9/30/2002 | 3 | 19 | 45.21 |
| 9/30/2002 | 3 | 20 | 19.44 |
| 9/30/2002 | 3 | 21 | 50.72 |
| 9/30/2002 | 3 | 22 | 24.91 |
| 9/30/2002 | 3 | 23 | 26.04 |
| 9/30/2002 | 3 | 24 | 33.34 |
| 9/30/2002 | 3 | 25 | 24.53 |
| 9/30/2002 | 3 | 26 | 30.61 |
| 9/30/2002 | 3 | 27 | 15.33 |
| 9/30/2002 | 3 | 28 | 289.15 |
| 9/30/2002 | 3 | 29 | 23.85 |
| 9/30/2002 | 3 | 30 | 29.19 |

Date .........Date for which power prices are simulated
Block An 8-hour daily interval - 1 is the interval from hour 1 to 8, 2 - hours 9 - 16, etc.
Path An index for the simulation run
Price Simulated power price

*Fig. 5*

| Date | Block | Path | Unit | %Lost | Unit | %Lost | Unit | %Lost | Unit | %Lost | Unit | %Lost | Unit | %Lost |
|---|---|---|---|---|---|---|---|---|---|---|---|---|---|---|
| 7/1/02 | 1 | 0 | 5 | 100% | 32 | 100% | 38 | 100% | 39 | 100% | 46 | 100% | 52 | 100% |
| 7/1/02 | 1 | 1 | 19 | 100% | 26 | 100% | 28 | 100% | 43 | 100% | 66 | 100% | 73 | 100% |
| 7/1/02 | 1 | 2 | 8 | 100% | 32 | 100% | 35 | 100% | 41 | 100% | 65 | 100% | 67 | 100% |
| 7/1/02 | 1 | 3 | 1 | 100% | 11 | 100% | 12 | 100% | 20 | 100% | 39 | 100% | 60 | 100% |
| 7/1/02 | 1 | 4 | 14 | 100% | 15 | 100% | 19 | 100% | 44 | 100% | 98 | 100% | 101 | 100% |
| 7/1/02 | 1 | 5 | 8 | 100% | 20 | 100% | 21 | 100% | 31 | 100% | 41 | 100% | 51 | 100% |
| 7/1/02 | 1 | 6 | 21 | 100% | 31 | 100% | 38 | 100% | 39 | 100% | 42 | 100% | 60 | 100% |
| 7/1/02 | 1 | 7 | 11 | 100% | 29 | 100% | 37 | 100% | 58 | 100% | 66 | 100% | 68 | 100% |
| 7/1/02 | 1 | 8 | 20 | 100% | 37 | 100% | 38 | 100% | 39 | 100% | 63 | 100% | 64 | 100% |
| 7/1/02 | 1 | 9 | 15 | 100% | 38 | 100% | 71 | 100% | 76 | 100% | 84 | 100% | 86 | 100% |
| 7/1/02 | 1 | 10 | 4 | 100% | 26 | 100% | 27 | 100% | 74 | 100% | 83 | 100% | 92 | 100% |
| 7/1/02 | 1 | 11 | 8 | 100% | 39 | 100% | 65 | 100% | 80 | 100% | 112 | 100% | 134 | 100% |
| 7/1/02 | 1 | 12 | 6 | 100% | 7 | 100% | 13 | 100% | 21 | 100% | 28 | 100% | 33 | 100% |
| 7/1/02 | 1 | 13 | 1 | 100% | 17 | 100% | 27 | 100% | 40 | 100% | 50 | 100% | 72 | 100% |
| 7/1/02 | 1 | 14 | 1 | 100% | 10 | 100% | 46 | 100% | 55 | 100% | 68 | 100% | 92 | 100% |
| 7/1/02 | 1 | 15 | 2 | 100% | 5 | 100% | 7 | 100% | 16 | 100% | 54 | 100% | 55 | 100% |
| 7/1/02 | 1 | 16 | 16 | 100% | 34 | 100% | 40 | 100% | 68 | 100% | 79 | 100% | 81 | 100% |
| 7/1/02 | 1 | 17 | 5 | 100% | 26 | 100% | 75 | 100% | 80 | 100% | 86 | 100% | 87 | 100% |
| 7/1/02 | 1 | 18 | 35 | 100% | 49 | 100% | 80 | 100% | 86 | 100% | 108 | 100% | 128 | 100% |
| 7/1/02 | 1 | 19 | 17 | 100% | 19 | 100% | 56 | 100% | 77 | 100% | 101 | 100% | 104 | 100% |
| 7/1/02 | 1 | 20 | 2 | 100% | 5 | 100% | 17 | 100% | 24 | 100% | 31 | 100% | 33 | 100% |
| 7/1/02 | 1 | 21 | 27 | 100% | 42 | 100% | 46 | 100% | 50 | 100% | 65 | 100% | 98 | 100% |
| 7/1/02 | 1 | 22 | 14 | 100% | 26 | 100% | 42 | 100% | 48 | 100% | 59 | 100% | 65 | 100% |
| 7/1/02 | 1 | 23 | 16 | 100% | 52 | 100% | 53 | 100% | 57 | 100% | 58 | 100% | 59 | 100% |
| 7/1/02 | 1 | 24 | 21 | 100% | 27 | 100% | 56 | 100% | 60 | 100% | 111 | 100% | 114 | 100% |
| 7/1/02 | 1 | 25 | 17 | 100% | 22 | 100% | 26 | 100% | 40 | 100% | 44 | 100% | 50 | 100% |
| 7/1/02 | 1 | 26 | 12 | 100% | 15 | 100% | 38 | 100% | 42 | 100% | 47 | 100% | 51 | 100% |
| 7/1/02 | 1 | 27 | 13 | 100% | 28 | 100% | 32 | 100% | 50 | 100% | 59 | 100% | 65 | 100% |
| 7/1/02 | 1 | 28 | 34 | 100% | 56 | 100% | 78 | 100% | 97 | 100% | 136 | 100% | 155 | 100% |
| 7/1/02 | 1 | 29 | 16 | 100% | 24 | 100% | 25 | 100% | 30 | 100% | 37 | 100% | 53 | 100% |
| 7/1/02 | 1 | 30 | 3 | 100% | 5 | 100% | 17 | 100% | 36 | 100% | 61 | 100% | 87 | 100% |
| 7/1/02 | 2 | 0 | 5 | 100% | 32 | 100% | 38 | 100% | 39 | 100% | 46 | 100% | 52 | 100% |
| 7/1/02 | 2 | 1 | 19 | 100% | 26 | 100% | 28 | 100% | 43 | 100% | 66 | 100% | 73 | 100% |
| 7/1/02 | 2 | 2 | 8 | 100% | 32 | 100% | 35 | 100% | 41 | 100% | 65 | 100% | 67 | 100% |
| 7/1/02 | 2 | 3 | 1 | 100% | 11 | 100% | 12 | 100% | 20 | 100% | 39 | 100% | 60 | 100% |
| 7/1/02 | 2 | 4 | 14 | 100% | 15 | 100% | 19 | 100% | 44 | 100% | 98 | 100% | 101 | 100% |

*Fig. 6a*

| Date | Block | Path | Unit | %Lost | Unit | %Lost | Unit | %Lost | Unit | %Lost | Unit | %Lost | Unit | %Lost |
|---|---|---|---|---|---|---|---|---|---|---|---|---|---|---|
| 9/30/02 | 3 | 0 | 5 | 100% | 11 | 100% | 15 | 100% | 24 | 100% | 25 | 100% | 28 | 100% |
| 9/30/02 | 3 | 1 | 20 | 100% | 21 | 100% | 63 | 100% | 77 | 100% | 84 | 100% | 90 | 100% |
| 9/30/02 | 3 | 2 | 19 | 100% | 30 | 100% | 38 | 100% | 60 | 100% | 66 | 100% | 87 | 100% |
| 9/30/02 | 3 | 3 | 6 | 100% | 25 | 100% | 31 | 100% | 48 | 100% | 102 | 100% | 108 | 100% |
| 9/30/02 | 3 | 4 | 14 | 100% | 29 | 100% | 37 | 100% | 51 | 100% | 55 | 100% | 61 | 100% |
| 9/30/02 | 3 | 5 | 17 | 100% | 24 | 100% | 41 | 100% | 46 | 100% | 106 | 100% | 117 | 100% |
| 9/30/02 | 3 | 6 | 42 | 100% | 57 | 100% | 58 | 100% | 77 | 100% | 85 | 100% | 97 | 100% |
| 9/30/02 | 3 | 7 | 22 | 100% | 26 | 100% | 44 | 100% | 55 | 100% | 58 | 100% | 68 | 100% |
| 9/30/02 | 3 | 8 | 13 | 100% | 35 | 100% | 46 | 100% | 78 | 100% | 94 | 100% | 97 | 100% |
| 9/30/02 | 3 | 9 | 2 | 100% | 3 | 100% | 79 | 100% | 93 | 100% | 99 | 100% | 101 | 100% |
| 9/30/02 | 3 | 10 | 23 | 100% | 26 | 100% | 27 | 100% | 35 | 100% | 53 | 100% | 61 | 100% |
| 9/30/02 | 3 | 11 | 11 | 100% | 21 | 100% | 32 | 100% | 44 | 100% | 51 | 100% | 68 | 100% |
| 9/30/02 | 3 | 12 | 4 | 100% | 34 | 100% | 36 | 100% | 40 | 100% | 56 | 100% | 95 | 100% |
| 9/30/02 | 3 | 13 | 16 | 100% | 49 | 100% | 59 | 100% | 79 | 100% | 88 | 100% | 91 | 100% |
| 9/30/02 | 3 | 14 | 5 | 100% | 19 | 100% | 22 | 100% | 46 | 100% | 54 | 100% | 61 | 100% |
| 9/30/02 | 3 | 15 | 24 | 100% | 29 | 100% | 40 | 100% | 48 | 100% | 67 | 100% | 77 | 100% |
| 9/30/02 | 3 | 16 | 4 | 100% | 16 | 100% | 20 | 100% | 24 | 100% | 85 | 100% | 126 | 100% |
| 9/30/02 | 3 | 17 | 5 | 100% | 39 | 100% | 42 | 100% | 43 | 100% | 72 | 100% | 76 | 100% |
| 9/30/02 | 3 | 18 | 20 | 100% | 32 | 100% | 43 | 100% | 55 | 100% | 58 | 100% | 62 | 100% |
| 9/30/02 | 3 | 19 | 12 | 100% | 13 | 100% | 33 | 100% | 39 | 100% | 40 | 100% | 50 | 100% |
| 9/30/02 | 3 | 20 | 2 | 100% | 5 | 100% | 8 | 100% | 11 | 100% | 12 | 100% | 31 | 100% |
| 9/30/02 | 3 | 21 | 7 | 100% | 19 | 100% | 21 | 100% | 47 | 100% | 60 | 100% | 63 | 100% |
| 9/30/02 | 3 | 22 | 24 | 100% | 40 | 100% | 41 | 100% | 63 | 100% | 83 | 100% | 85 | 100% |
| 9/30/02 | 3 | 23 | 1 | 100% | 12 | 100% | 13 | 100% | 44 | 100% | 64 | 100% | 71 | 100% |
| 9/30/02 | 3 | 24 | 2 | 100% | 14 | 100% | 34 | 100% | 37 | 100% | 39 | 100% | 40 | 100% |
| 9/30/02 | 3 | 25 | 30 | 100% | 49 | 100% | 58 | 100% | 63 | 100% | 93 | 100% | 98 | 100% |
| 9/30/02 | 3 | 26 | 2 | 100% | 26 | 100% | 32 | 100% | 35 | 100% | 44 | 100% | 76 | 100% |
| 9/30/02 | 3 | 27 | 11 | 100% | 45 | 100% | 87 | 100% | 94 | 100% | 109 | 100% | 137 | 100% |
| 9/30/02 | 3 | 28 | 3 | 100% | 14 | 100% | 16 | 100% | 17 | 100% | 26 | 100% | 27 | 100% |
| 9/30/02 | 3 | 29 | 12 | 100% | 20 | 100% | 46 | 100% | 58 | 100% | 63 | 100% | 66 | 100% |
| 9/30/02 | 3 | 30 | 23 | 100% | 29 | 100% | 32 | 100% | 119 | 100% | 120 | 100% | 143 | 100% |

Date    Date for which outages are simulated
Block    An 8-hour daily interval - 1 is the interval from hour 1 to 8, 2 - hours 9 - 16, etc.
Path    An index for the simulation run
Unit    The ID of a unit in the stack
% Lost    % of the unit capacity lost due to a forced outage or derating

*Fig. 6b*

METHOD FOR PRODUCING A SUPERIOR INSURANCE MODEL FOR COMMODITY EVENT RISK

TECHNICAL FIELD

The present invention relates to commodity industries and, more particularly, to an approach to insure event risks while also calculating an appropriate hedge amount.

BACKGROUND OF THE INVENTION

One of the most technological advancements that occurred during the $20^{th}$ century was the widespread use of electric power. As power distribution moved from locally based generators to a massive, intertwined and interconnected grid that spanned the entire U.S. continent, industrial plants were set free from the constraints of having to be established in close proximity to power sources. During this time, electric power migrated from luxury, to necessity and today, is currently traded on the open market as a commodity by pioneers such as Mirant.

One risk that electric power producers face is a forced outage of one of the producer's generation facilities. The main risk of a forced outage is that the forced outage will occur while power prices are high and the power plants will not be able to generate electricity. This prevents the power producer from collecting the associated profit from the power during this period of outage. In addition, to supplement the loss of electricity, the producer must seek an alternate source and pay a price determined by the market at the time of the forced outage. Therefore, many power producers are interested in purchasing insurance that will reimburse them when their power plants experience a forced outage at the same time that power prices are above a certain price. Insurance companies are not able to issue insurance to cover a risk unless a model is created that will predict the liability associated with an outage of a power plant.

Therefore, there is a need in the art for an approach to insure event risks while also calculating an appropriate hedge amount.

SUMMARY OF THE INVENTION

The present invention is directed towards solving the aforementioned needs in the art, as well as other needs in the art, by providing an approach to insure event risks while also calculating an appropriate hedge amount using the underlying commodity, derivative of the underlying commodity, or related commodity.

One aspect of the present invention is a method for determining a combination of insurance premiums to charge and a hedge amount to place using, commodity call options or such instruments, such that some measure of return of the total portfolio of the insurance policy meets some minimum or maximum criteria. The unique aspect of this invention id finding the optimal hedge for a given commodity such that there is a superior measure of return on the insurance portfolio compared to other hedged or un-hedged portfolios. The present invention provides a method for valuating insurance policies comprising (1) generation of price paths (for on-peak power), including dependence of prices and outages, either from a fundamental asset model, or from a combination hybrid lognormal/stack-based model; (2) calculating insurance payouts, incorporating deductibles and maximum payouts; (3) calculating daily call payouts; (4) calculating various statistics of a composite portfolio consisting of insurance payout obligations and daily call options; and (5) selecting an insurance premium and a hedge amount.

These aspects and embodiments, as well as other aspects and embodiments of the present invention are more clearly described in the specification, figures and claims.

BRIEF DESCRIPTION OF THE DRAWINGS

FIG. 5 is an example of forward price scenarios (price paths) that are used by a forced outage insurance model.

FIGS. 6a and 6b are an example of the unit outage simulation scenarios (outage paths) that are used by a forced outage insurance model.

DETAILED DESCRIPTION

Turning now to the figures in which like numerals represent like elements throughout the several views, several exemplary embodiments of the present invention are described.

This invention can be applied to any commodity market exposed to event risks where hedging instruments are available in the commodity or in a related commodity. Commodities that are covered include but are not limited to electric power, natural gas, grains, agricultural products, metals, petrochemicals, energy products such as heating oil, jet fuel, crude oil and distillate products thereof, pulp and paper, plastics, integrated circuit chips such as Dynamic Random Access Memory (DRAM), and other traded commodities. The electric power industry is used as an exemplary embodiment of the present invention.

The present invention predicts the costs associated with a forced outage and models insurance products designed to protect power producers from the losses associated with a forced outage. Typically, a forced outage is any outage or partial outage that is not voluntary. A forced outage may be caused by, but is not limited to an outage caused by, mechanical failure, environmental shutdown, weather events, natural disasters, or lack of necessary resources. In accordance with alternative embodiments of the present invention, a company offering forced outage insurance may limit or expand the definition of a forced outage and the operation of the present invention is not limited to any one definition.

Figure 1:
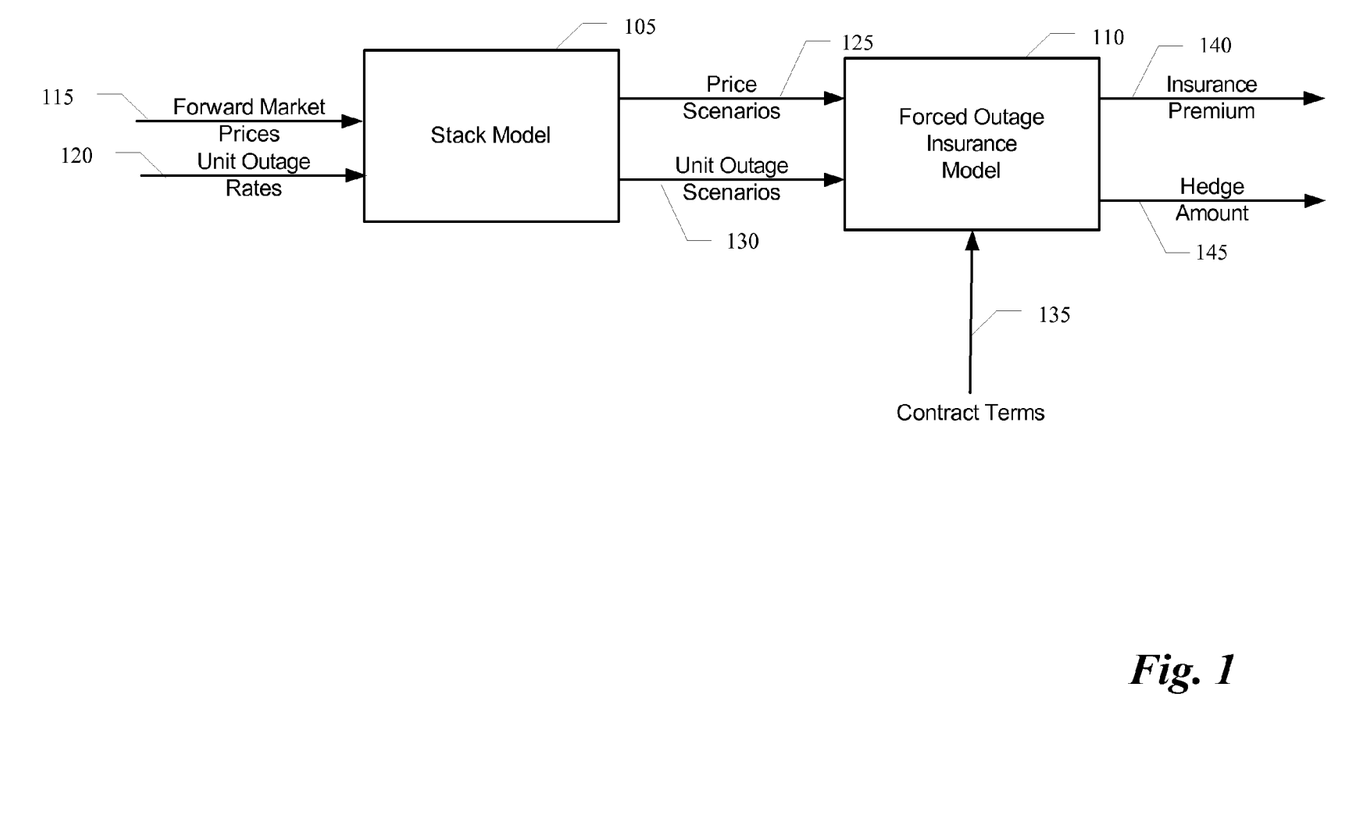
FIG. 1 is a block diagram illustrating a typical system architecture for a system for implementing an exemplary embodiment of the present invention.

FIG. 1 is a block diagram illustrating an exemplary embodiment of the present invention. The forced outage insurance model 110 interfaces with a stack model 105. The details of the operation of the stack model 105 may vary among various embodiments of the present invention. However, in an exemplary embodiment, the stack model 105 receives forward market prices 115 and unit outage rates 120 and outputs price scenarios 125 and unit outage scenarios 130. The price scenarios 125 and the unit outage rates 130 of the stack model 105 are communicated to the forced outage insurance model 110 for processing. The forced outage insurance model 110 also incorporates contract terms 135 and generates a suggested insurance premium 140 and hedge amount 145. Contract terms 135 refer to the terms of the insurance contract. Contract terms 135 may include, but are not limited to, policy limits, deductible amounts, definitions of forced outages, and other terms generals specified in an insurance contract. The insurance premium 140 refers to the price paid to obtain an insurance policy for a specified insurance period. The hedge amount 145 refers to the megawatt (MW) quantity of daily calls that are purchased in the power market to insure access to power at a given price.

Figure 2:
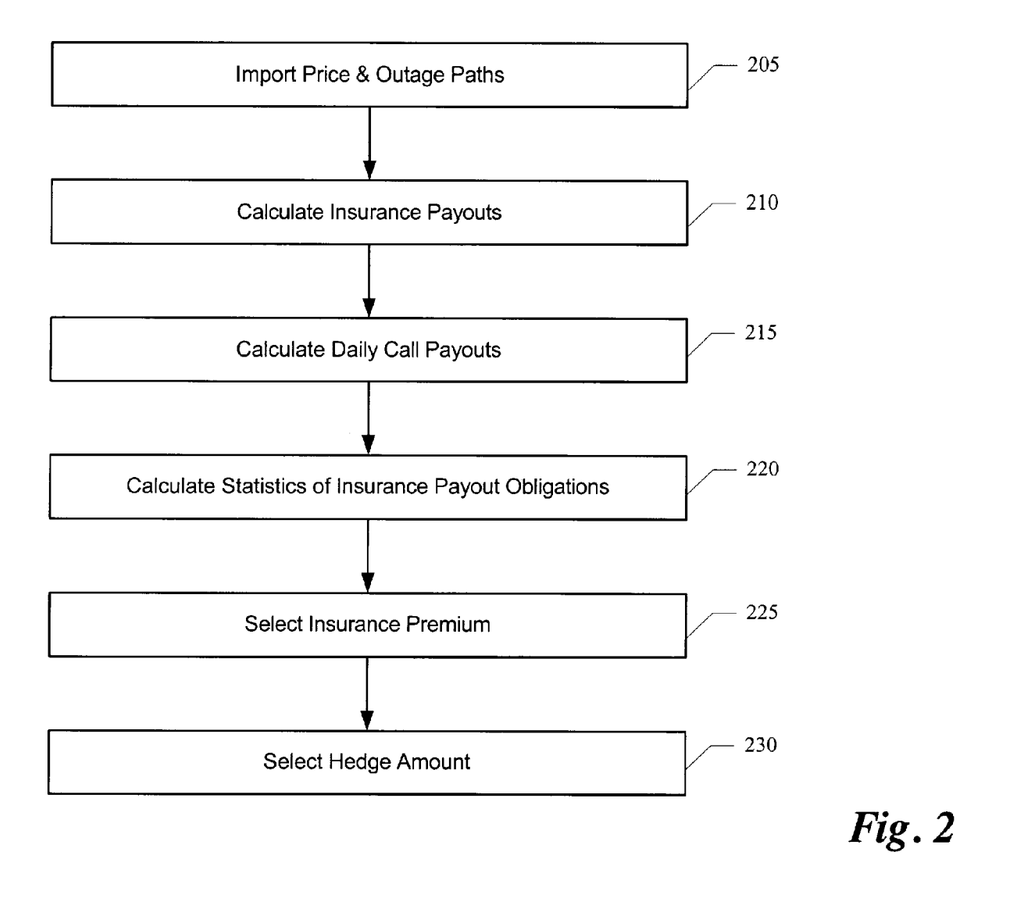
FIG. 2 is a flow diagram illustrating a method of producing a forced outage insurance model according to an exemplary embodiment of the present invention.

FIG. 2 is a flow diagram illustrating the operation of a forced outage insurance model according to an exemplary embodiment of the present invention. In an exemplary embodiment of the present invention, the first step in determining the insurance premium 140 to be charged for forced outage insurance is the calculation of the expected payoffs of the forced outage insurance by generating price paths 205. Without deductibles and caps, the daily payoff to the owner of forced outage insurance is:

$$16hxCxmax(0, P^{on}-K)$$

where $P^{on}$ is the average on peak power price for that day

K is the forced outage insurance strike price, and

C is the MW capacity lost to a forced outage or derating of the power plant.

In a simplified exemplary embodiment of the present invention, the owner of the forced outage insurance will receive the above payoffs everyday during the duration of the insurance. In practice however, and in accordance with an exemplary embodiment of the present invention, one or more deductibles are usually written into the forced outage insurance contract, which cause the insurance owner to receive only the payoff in excess of a dollar denominated deductible, and for the lost megawatts (MW) in excess of a MW deductible. The owner of the forced outage insurance will receive only the payoff in excess of the per event deductible, every time the plant experiences a forced outage, until a period deductible limit has been reached. Once the period deductible limit has been reached, the owner will receive the full daily payoffs due to future forced outages. Period deductible limits limit the total deductible paid for multiple events within an insurance period. In an exemplary embodiment of the present invention, the period is one year and the period deductible resets at the end of the year. Alternatively, any length period may be used. Megawatt deductibles are defined on an aggregate or franchise basis. In the presence of an aggregate MW deductible, only lost megawatts above the deductible are covered. If a MW deductible is of the franchise type, all lost megawatts are covered if the losses exceed the amount of the deductible. Finally, there is usually a maximum amount of money that the owner of the forced outage insurance can receive. Once the owner receives payoffs that sum to the forced outage insurance maximum (period payout cap), the owner will receive no more payoffs. In an exemplary embodiment of the present invention, the period payout cap resets each insurance period (i.e. at the end of each year). Alternatively, a lifetime cap may be used or any other period length may be used to limit the total insurance payout.

In an exemplary embodiment of the present invention, the forced outage insurance does not take effect unless there is a forced outage and the price of on-peak power is above a predetermined strike price. In an exemplary embodiment of the present invention, the strike price is the price of power above which the insurance policy is in effect. Accordingly, if a power plant experiences a forced outage while the price of power is below the strike price, no claim may be made against the forced outage insurance policy. The strike price of the forced outage insurance will typically be set around 150% to 200% of the on-peak forward power price. In an exemplary embodiment of the present invention, forced outage insurance is intended to insure against outages only when the price of power is particularly high. Thus, the inclusion of a strike price more accurately corresponds to the desired insurance. Since the present invention deals with contracts for which insurable losses are set above some high strike value, it is assumed that the insured unit is needed for operation when the power demand is high enough to cause the price to reach the strike value and, thus, in operation when an insurable outage occurs. Thus, for the purposes of insurance valuation, dispatch issues of whether a plant would have been running when an outage occurred is ignored.

Those familiar with insurance contracts will understand that the deductibles described herein are examples of typical deductible formulation. Alternatively, any, or no, deductible schedule may be used in accordance with the present invention.

In accordance with an exemplary embodiment of the present invention, the calculation of the insurance payout 210 proceeds as follows. First, power prices and unit outages over the insurance term are simulated using a stack model and imported into the forced outage insurance model. (See FIGS. 5 and 6*a-b*). The number of simulation runs (paths) is selected so that the resulting sampling error is below a certain dollar threshold. For each particular simulation path, for each day d, the following loss function is calculated:

$$L_d=16xmax(0, C-MWDeductable)xmax(0, P_d^{on}-K)$$

where again C denotes the megawatts of lost unit capacity, K is the insurance strike, and $P_d^{on}$ is the average on-peak power price on day d.

Next, the insurable events are determined. An insurable event is defined to be a group of consecutive days that the power generation unit is down or derated beyond the MW deductible, and which results in a total loss (the sum of the losses over each day in the event) that is greater than the current deductible. The current dollar deductible is equal to the event deductible up to the value of the period deductible. There can be a different deductible for each unit in the portfolio. In an exemplary embodiment of the present invention, the outages of each unit are simulated independently. In such an embodiment, the cases in which two or more units are down due to the same proximate cause are not considered. When two or more units are down due to the same proximate cause, it is considered one event from the perspective of the insurance contract. The current dollar deductible must be distinguished from the event dollar deductible. For each simulated path, a cumulative deductible is computed and is equal to the sum of all deductibles paid up to the current time, including losses below the current deductible. If the cumulative deductible has not exceeded the maximum period deductible, then the current deductible is either the per event deductible, or, if smaller, the difference between the maximum period deductible and the cumulative deductible. If the maximum period deductible has been exceeded for that path, then the current deductible is zero.

For example, suppose there is an event deductible of $1,000,000, and a maximum period deductible of $3,000,000. Then, suppose there are three events, each of which is above the per event deductible. For the next event, no deductible will be applied, since the maximum period deductible has been satisfied. In other words, each subsequent loss (for which the price is above the strike) will be entirely covered.

For each outage event along a simulation path, there is a corresponding current deductible. The potential insurance payout is the difference between the loss due the event and the current deductible, if the loss exceeds the latter. The word "potential" is used, because if there is a cap or a maximum payout, then the insurance payout just computed must be modified. For example, suppose there is a cap of $100,000 and the amount that has already been paid out in insurance losses is $95,000. Suppose an insurable loss of $10,000 is incurred. In this case, the insurance company would only pay $5,000 because paying the entire $10,000 would exceed the cap. So for each insurable loss, the insurance company must check Oust as in this example) how much must be paid out to remain within the cap. Once the cap has been attained, then subsequent losses are not insured.

Figure 3:
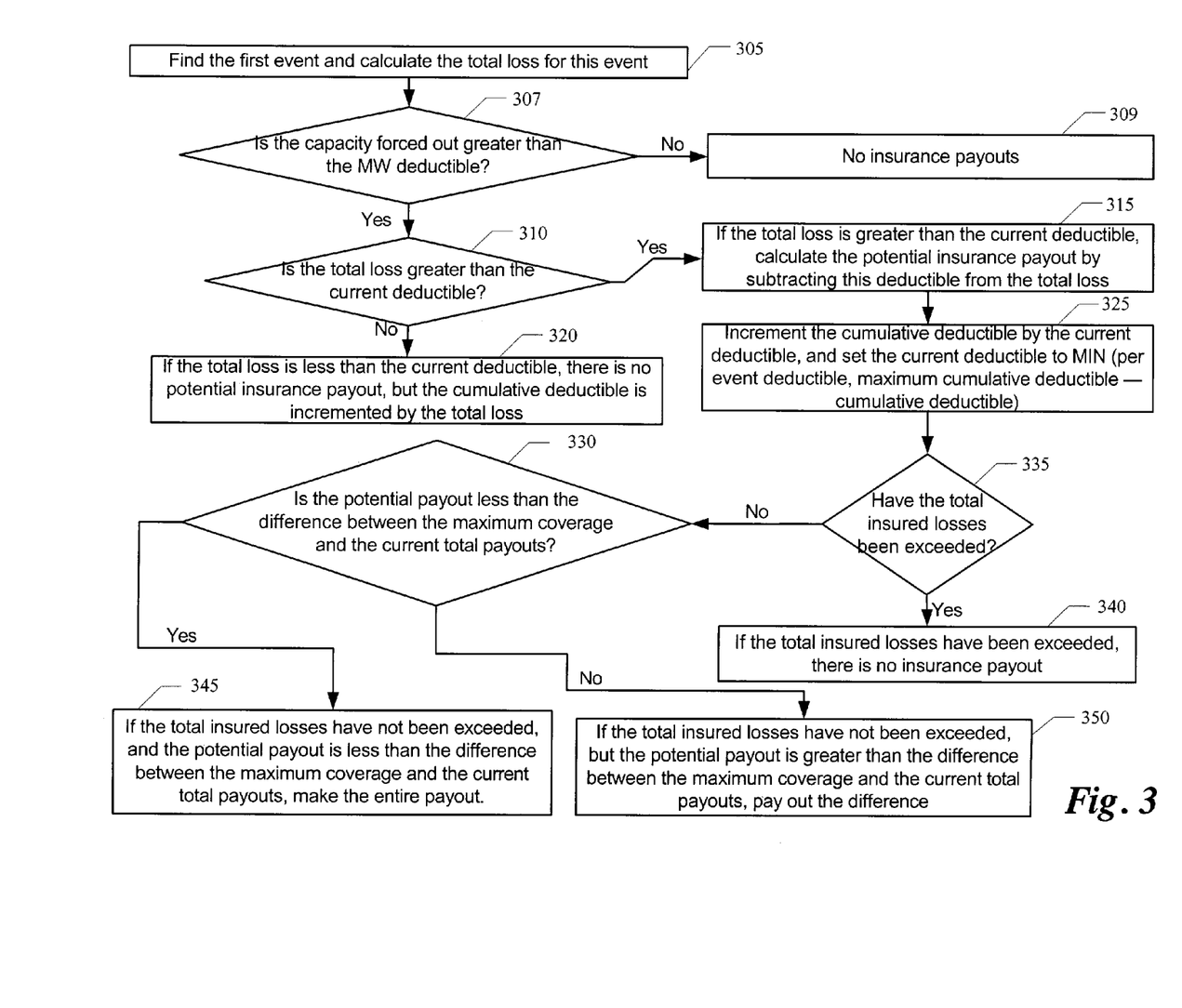
FIG. 3 is a flow diagram illustrating the calculation of a forced outage insurance payout according to an exemplary embodiment of the present invention in which deductibles and maximum payouts are used.

FIG. 3 is a flow diagram illustrating the calculation of a forced outage insurance payout according to an exemplary embodiment of the present invention in which deductibles and maximum payouts are used. Based on the terms defined above, the entire process may be outlined as follows:

For each path,
1. Starting with the first day of the coverage period, find the first event, and calculate the total loss for this event 305.
2. If the capacity forced out is less than the MW deductible 307, there is no insurance payout 309. If the capacity forced out is greater than the MW deductible 307, determine if the total loss is greater than the current deductible 310.
3. If the total loss is greater than the current deductible 310, calculate the potential insurance payout by subtracting this deductible from the total loss 315. Next, increment the cumulative deductible (initialized to zero) by the current deductible, and set the current deductible to MIN (per event deductible, maximum cumulative deductible—cumulative deductible) 325. For example, if the cumulative deductible is $2,500,000, the maximum cumulative deductible is $3,000,000, and the per event deductible is $1,000,000, the current deductible (the deductible for the next loss) would be $500,000. If the total loss is less than the current deductible 310, there is no potential insurance payout, but the cumulative deductible is incremented by the total loss 320.
4. If the total insured losses have not been exceeded 335, and the potential payout is less than the difference between the maximum coverage and the current total payouts 330, make the entire payout 345; otherwise, pay out the difference 350. If the total insured losses have been exceeded 335, there is no insurance payout 340.

This procedure takes place for each path, and the total expected payout is simply the average over all paths.

In an exemplary embodiment of the present invention, exposure to loss is reduced by hedging. Hedging may be performed by purchasing daily calls of power to assure access to a certain quantity of power at a predetermined price. Assume that an insurance company sells 500 MW of forced outage insurance. Since this will leave them exposed to some very large losses, a hedging strategy has to be constructed to minimize the maximum loss. Forced outage insurance can be viewed as a call option on the daily average on-peak power price, with the additional condition that the insured power plant must be experiencing a forced outage. Therefore, a straightforward way to hedge a short position in forced outage insurance is to buy call options on the daily average on-peak power price (daily calls). However, purchasing 500 MW of daily calls would not be an appropriate hedge because the daily calls do not have the additional condition that the power plant must experience a forced outage. Therefore, some hedge amount less than 500 MW must be purchased so that the payoffs of the call option more accurately match the payoffs of the forced outage insurance.

In an exemplary embodiment of the present invention, the daily call payout is calculated 215 as follows: for each on-peak day along a path, if the on-peak power price is above the call strike, the payout is the price minus the strike, times 16 (on-peak) hours. Since the number of hours is already incorporated and the total payout is a running sum along on-peak days, the units of this output is $/MW as shown below:

$$C=(\text{price } \$/MWh - \text{strike price } \$/MWh) \times 16h = 16 (\text{price}-\text{strike price})\$/MW.$$

In an exemplary embodiment of the present invention, statistics are examined to determine appropriate insurance hedges and premiums 220. Once the insurance and call payouts have been calculated for each path, the next step is to examine the statistics of the following quantity (the daily profit or loss of our total position):

$$P\$ = I\$ + xMW \times C\$/MW - A\$ - 16h \times N \times xMW \times C_p \$/MWh$$

where
- I is the insurance loss ($)
- C is the call payout ($/MW)
- x is the hedge amount (MW)
- A is the insurance premium ($)
- N is the number of on-peak days
- $C_p$ is the price paid for the daily call ($/MWh)

Calculation of I involves parameters determined by the forced outage insurance contract (e.g., insurance strikes) and the probability of forced outage (determined from historical data), and $C_p$ is a quoted price. Therefore, the only remaining free variables are A, the daily forced outage insurance premium, and x, the size of the hedge. (Note that the insurance and call payouts are summed, for each path, over all the insured periods, e.g., the summer months of some year.) The following statistics may be determined, as a function of the hedge amount x and the insurance premium A:

- Expected value of P
- Standard deviation of P
- Maximum loss (negative of the minimum over all paths of P)
- Expected loss (average over the negative part of each P)
- "Sharpe" ratio: ratio of the expected value of P to its standard deviation
- Conditional Expected Profit to Conditional Expected Loss
- Payoff to 95%: ratio of the expected value of P to the 95 percentile loss The next step is to use these statistics to choose a particular set of hedges and premiums 225, 230.

In an exemplary embodiment of the present invention, insurance premiums and call hedges are selected after examination of the statistics 225, 230. One problem to be solved is how to determine an insurance premium to charge, and how much of the exposure to hedge through purchasing daily call options. One solution, according to an exemplary embodiment of the present invention, may be illustrated as follows. The insurance company picks a measure of desired performance, based on the statistically derived ratios discussed above, and finds the minimum premium that may be charged while still being able to hedge and achieve that desired ratio. This objective is displayed in FIG. 4 for sample data involving the Sharpe ratio.

Figure 4:
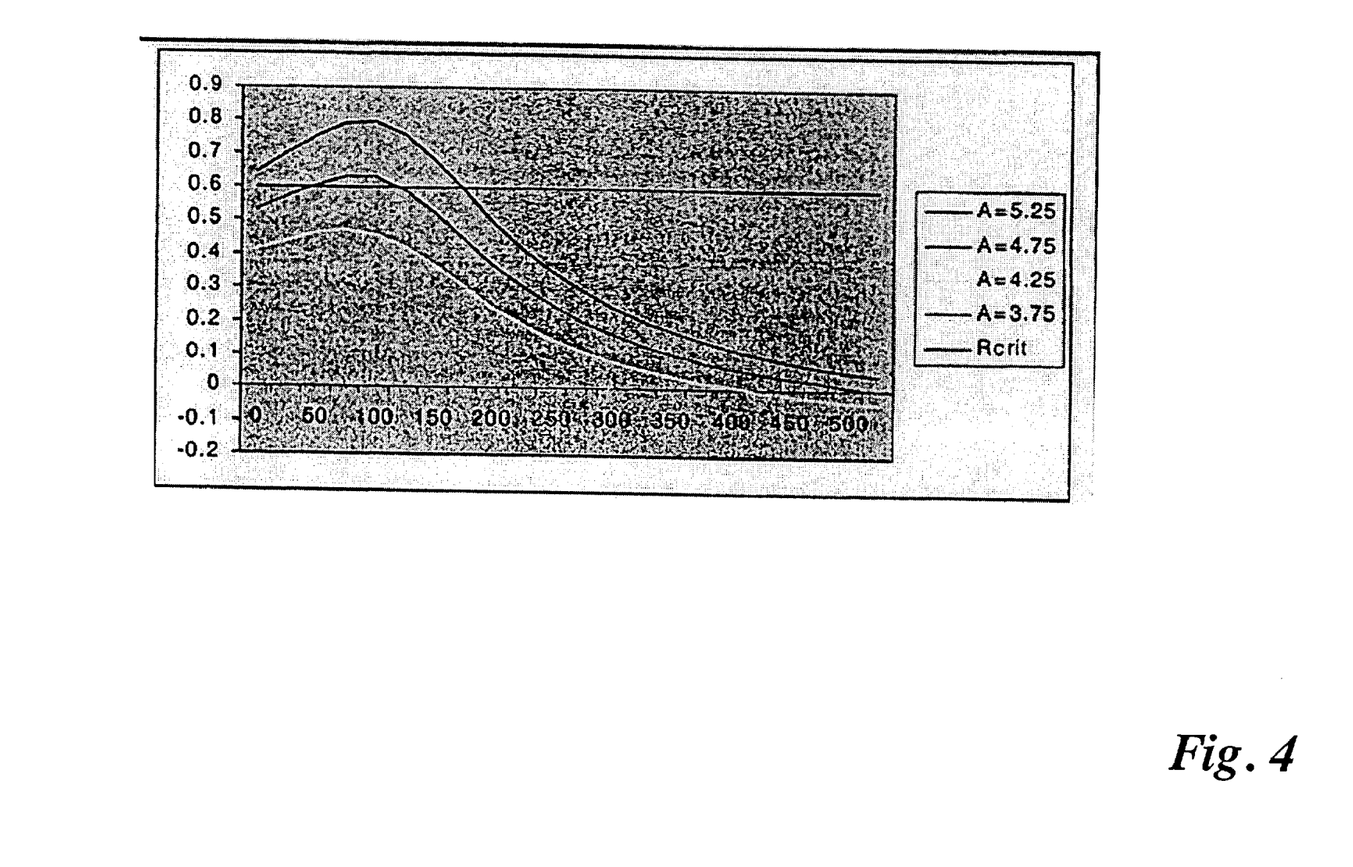
FIG. 4 is a graph illustrating the process of identifying the optimal premium - hedge combination that satisfies a given Sharpe ratio Criteria.

In FIG. 4, it is assumed that a portfolio with a Sharpe ratio (ratio of expected payoff to standard deviation) of 0.6 is desired. In this graph, by increasing the premium charged (A, in millions), ranges of x (the amount to hedge) that will result in a portfolio with this desired Sharpe ratio may be produced. However, by pricing the premium too high, there is a risk of making the contract non-marketable. Therefore the smallest premium possible to satisfy the desired return parameter(s) is sought. For the example under consideration, the graph of FIG. 4 indicates that a (total) premium of about 4.75 million dollars should be charged and about 100 MW of daily calls should be bought.

This idea can be extended to any of the ratios computed for the portfolio (or others deemed to be of importance). The rationale behind these ratios can be briefly summarized:

"Sharpe" ratio: The Sharpe ratio is a classic measure of portfolio performance which indicates the expected rate of return per unit of risk associated with achieving that return. According to an exemplary embodiment of the present invention, an expected payoff is used, not a rate of return. Thus, this is not, strictly speaking, a "pure" Sharpe ratio.

Payoff to 95%: Motivated by the need for captive capital requirements, equal to 95% of the maximum loss. This ratio reflects the rate of return on capital and is often used by hedge funds.

Conditional payoff to the conditional loss: Similar to Payoff to 95% ratio.

Another aspect of an exemplary embodiment of the present invention allows the partnership of two insuring parties to allocate losses, and thus share premiums. In such an embodiment, there may be some cut-off of losses, below which the first company is responsible for insuring some high percentage of losses (i.e. 90-100%), and above which the first company is responsible for covering some smaller percentage of losses (i.e. 25%). The second insuring company would cover the remaining losses. However, this feature, while incorporated into the model, does not affect things qualitatively, as the invention still deals with an insurance contract and an obligation to cover some losses. The only thing that changes is quantitative, the size of the losses covered (and hence the size of the premiums that can be charged).

While this invention has been described in detail with particular reference to preferred embodiments thereof, it will be understood that variations and modifications can be effected within the scope of the invention as defined in the appended claims.

What is claimed is:

1. A method for generating an insurance premium and hedge amount for event risk insurance for a commodity, the method comprising the steps of:
   receiving a price scenario input;
   receiving an event risk scenario input;
   calculating insurance payouts;
   calculating daily call payouts; and
   calculating statistics of insurance payout obligations P as a function of the hedge amount x and the insurance premium A, where P is calculated using the following equation:

$P(\text{dollars}) = I(\text{dollars}) + \chi(\text{megawatt}) \times C(\text{dollars/megawatt}) - A(\text{dollars}) - 16\text{hours} \times N \times \chi(\text{megawatt}) \times C_P$ (dollar/megawatt-hours), and where I is the insurance payouts (dollars);
   C is the daily call payouts (dollars/megawatt);
   $\chi$ is the hedge amount (megawatt);
   A is the insurance premium (dollars);
   N is the number of on-peak days; and
   $C_P$ is the price paid for the daily call (dollars/megawatt-hour);
   selecting an insurance premium and a hedge amount in response to receiving the price scenario input and the event risk scenario input and based on a selected target value for one or more of the statistics of P; and
   applying the selected insurance premiums and hedge amounts in the provision of commodity insurance for the development of a portfolio in the commodity market.

2. The method of claim 1, wherein the step of calculating statistics of P further comprises calculating the ratio of the expected value of P to its standard deviation and the step of selecting an insurance premium and hedge amount further comprises selecting a insurance premium and hedge amount that results in a selected target ratio.

3. A method for generating an insurance premium and hedge amount for forced outage insurance for electric power, the method comprising the steps of:
   receiving a price scenario input;
   receiving a unit outage scenario input;
   calculating insurance payouts;
   calculating daily call payouts;
   calculating statistics of insurance payout obligations by examining the statistics of P as a function of the hedge amount $\chi$ and the insurance premium A, where P is calculated using the following equation:

$P(\text{dollars}) = I(\text{dollars}) + \chi(\text{megawatt}) \times C(\text{dollars/megawatt}) - A(\text{dollars}) - 16\text{hours} \times N \times \chi(\text{megawatt}) \times C_P$ (dollar/megawatt-hours), and where I is the insurance payouts (dollars);
   C is the daily call payout (dollars/megawatt);
   $\chi$ is the hedge amount (megawatt);
   A is the insurance premium (dollars);
   N is the number of on-peak days; and
   $C_P$ is the price paid for the daily call (dollars/megawatt-hour);
   selecting an insurance premium and a hedge amount in response to receiving the price scenario input and the unit outage scenario input based on a selected target value for one or more of the statistics of P; and
   applying the selected insurance premiums and hedge amounts in the provision of commodity insurance for the development of a portfolio in the electric power market.

4. The method of claim 3, wherein the step of examining the statistics of P further comprises examining one or more of the values selected from the group of values including: expected value, standard deviation, maximum loss, expected loss, and ratio of expected value to standard deviation.

* * * * *